(12) United States Patent
Chen

(10) Patent No.: US 6,499,873 B1
(45) Date of Patent: Dec. 31, 2002

(54) FRUIT/VEGETABLE BLENDER

(75) Inventor: Farmer Chen, Taipei Hsein (TW)

(73) Assignee: Quality & Strength Inc., Hsinchu (TW)

( * ) Notice: Subject to any disclaimer, the term of this patent is extended or adjusted under 35 U.S.C. 154(b) by 62 days.

(21) Appl. No.: 09/722,091

(22) Filed: Nov. 24, 2000

(51) Int. Cl.[7] .............................. A23N 1/00; B01F 7/24; B02C 13/00
(52) U.S. Cl. ..................... 366/197; 366/199; 366/205; 366/331; 310/89; 241/73; 241/282.2; 241/285.1
(58) Field of Search ................................. 366/197, 199, 366/205, 314, 306, 331; 241/282.2, 282.1, 285.1, 285.2, 73, 74; 310/43, 89, 42

(56) References Cited

U.S. PATENT DOCUMENTS

| | | | | |
|---|---|---|---|---|
| 2,028,595 A | * | 1/1936 | Flegel | 366/306 |
| 2,744,203 A | * | 5/1956 | Collura | 366/205 |
| 2,761,659 A | * | 9/1956 | Collura | 366/205 |
| 2,822,485 A | * | 2/1958 | Braun et al. | 366/205 |
| 3,054,565 A | * | 9/1962 | Willems | 366/314 |
| 3,342,425 A | * | 9/1967 | Morton | 366/314 |
| 3,540,234 A | * | 11/1970 | Raymond | 366/205 |
| 3,548,280 A | * | 12/1970 | Cockroft | 241/282.1 |
| 3,575,524 A | * | 4/1971 | Adajian | |
| 3,730,490 A | * | 5/1973 | Oberg | 241/282.2 |
| 3,738,616 A | * | 6/1973 | Copeland et al. | 241/285.2 |
| 3,901,484 A | * | 8/1975 | Ernster | 241/282.2 |
| 4,101,279 A | * | 7/1978 | Aslam | 366/314 |
| 4,783,173 A | * | 11/1988 | Artin | 366/205 |
| 5,273,358 A | * | 12/1993 | Byrne et al. | |
| 5,662,032 A | * | 9/1997 | Baratta | |
| 5,690,021 A | * | 11/1997 | Grey | 366/205 |
| 6,069,423 A | * | 5/2000 | Miller et al. | |

* cited by examiner

Primary Examiner—Tony G. Soohoo

(57) ABSTRACT

A blender includes a base on which a motor is connected and a plurality of ventilation holes are defined through a bottom of the base. An engaging collar is connected to the motor for rotating a blade device of a container mounted to the base. The heat generated from the motor is removed from the ventilation holes in the bottom of the base.

20 Claims, 10 Drawing Sheets

FRUIT/VEGETABLE BLENDER

FIELD OF THE INVENTION

The present invention relates to a blender having ventilation holes defined in the motor base for removing heat from the motor and ribs on the blade disk for kicking fruit on the disk to bounce to be cut by the blades.

BACKGROUND OF THE INVENTION

A conventional blender for mixing and shredding fruit or vegetable generally includes a motor base for receiving a motor therein which drives a blade means in a bottom of a container. Fruit and/or vegetable in the container are shredded or cut by the rotational blades on the blade means to become liquid. However, because the motor generates heat during operation and there is no ventilation device in the motor base so that the term of use of the motor will be reduced by the heat. The motor is generally threaded to the motor base and this takes a lot of time. Furthermore, the fruit and/or vegetable on the inner bottom of the container cannot be cut by the blades because the blades extends from the inner bottom of the container so that large particles exist in the mixture.

The present invention intends to provide a blender that removes heat from the bottom of the motor base and the fruit and/or vegetable will jump to be cut during the rotation of the blade disk.

SUMMARY OF THE INVENTION

In accordance with one aspect of the present invention, there is provided a blender comprising a motor base having a base and a plurality of ventilation holes defined through a bottom of the base. A motor is connected to the base and an engaging collar is connected to the motor. A casing is mounted to the base and the engaging collar is received in a central hole in the casing. A container is mounted to the motor base and a blade device is located on an inner bottom of the container.

The primary object of the present invention is to provide a blender wherein heat generated from the motor releases from ventilation holes defined in a bottom of the base.

Another object of the present invention is to provide a blender wherein particles of fruit and/or vegetable will bounce up and be cut by blades by ribs on the inner bottom of the container.

Yet another object of the present invention is to provide a blender wherein a filter member is mounted to the blade device so as to separate the larger particle from the juice.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
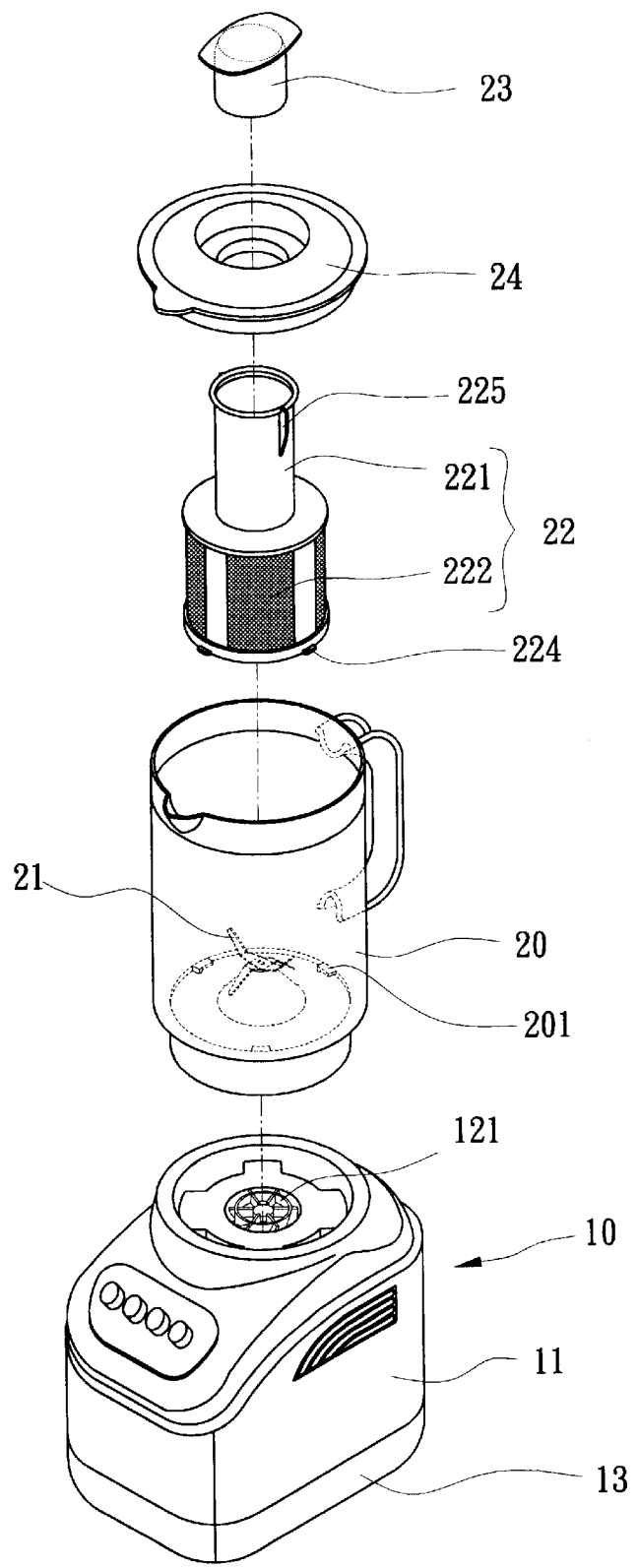
FIG. 1 is an exploded view to show a blender of the present invention.
Figure 2:
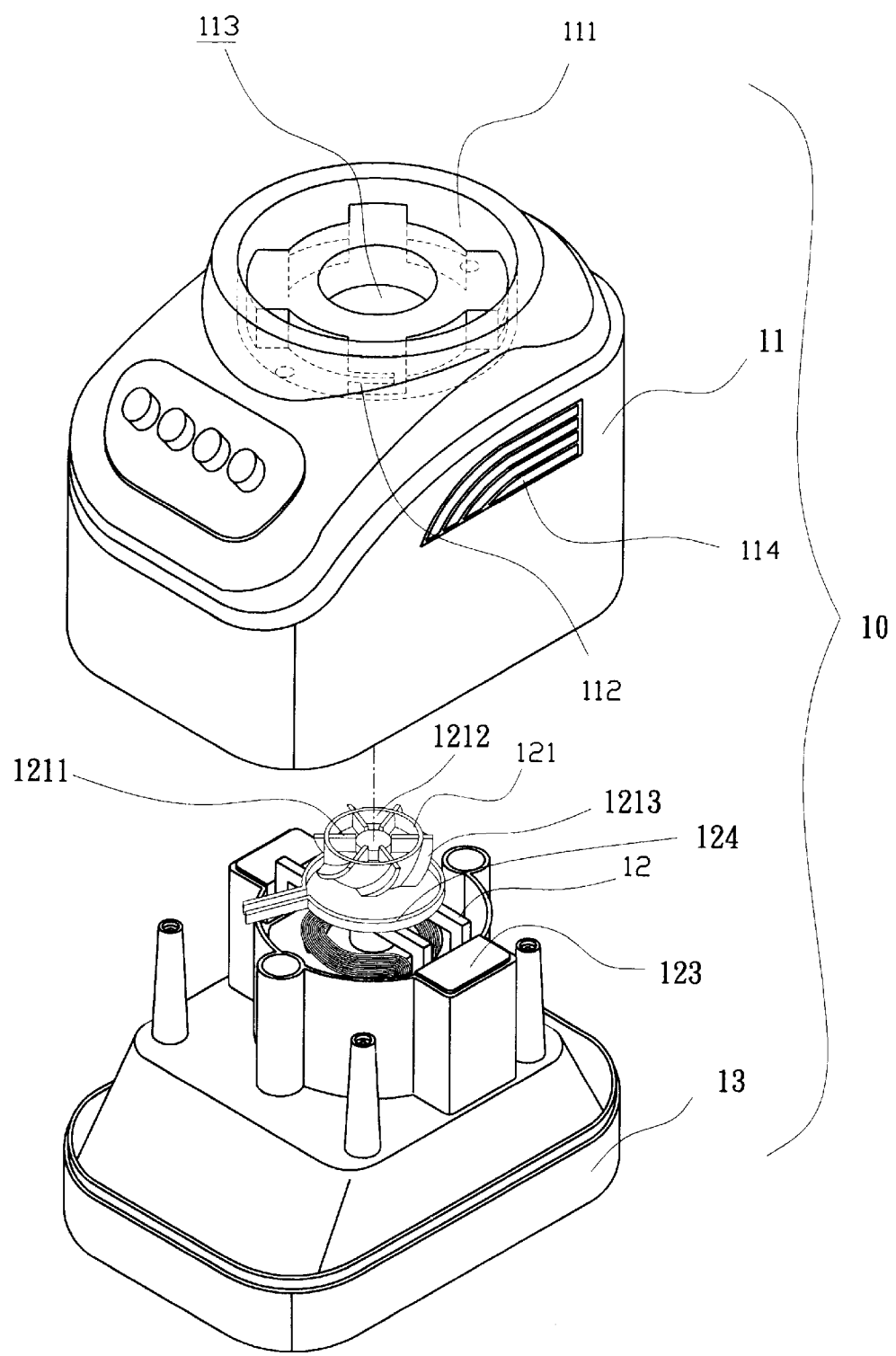
FIG. 2 is an exploded view to show a motor base of the blender of the present invention.
Figure 3:
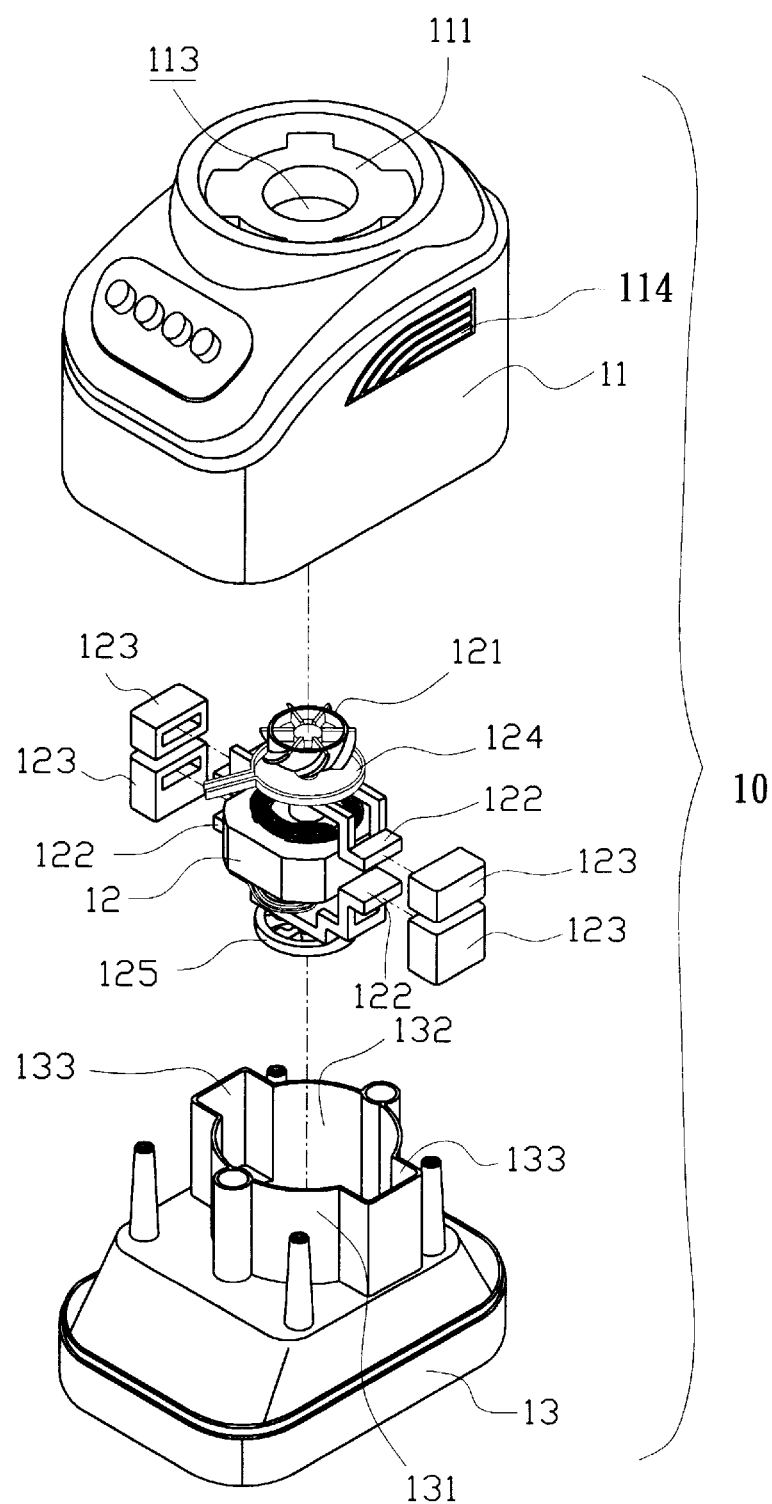
FIG. 3 is an exploded view to show a casing, a base and a motor of the motor base of the blender of the present invention.
Figure 4:
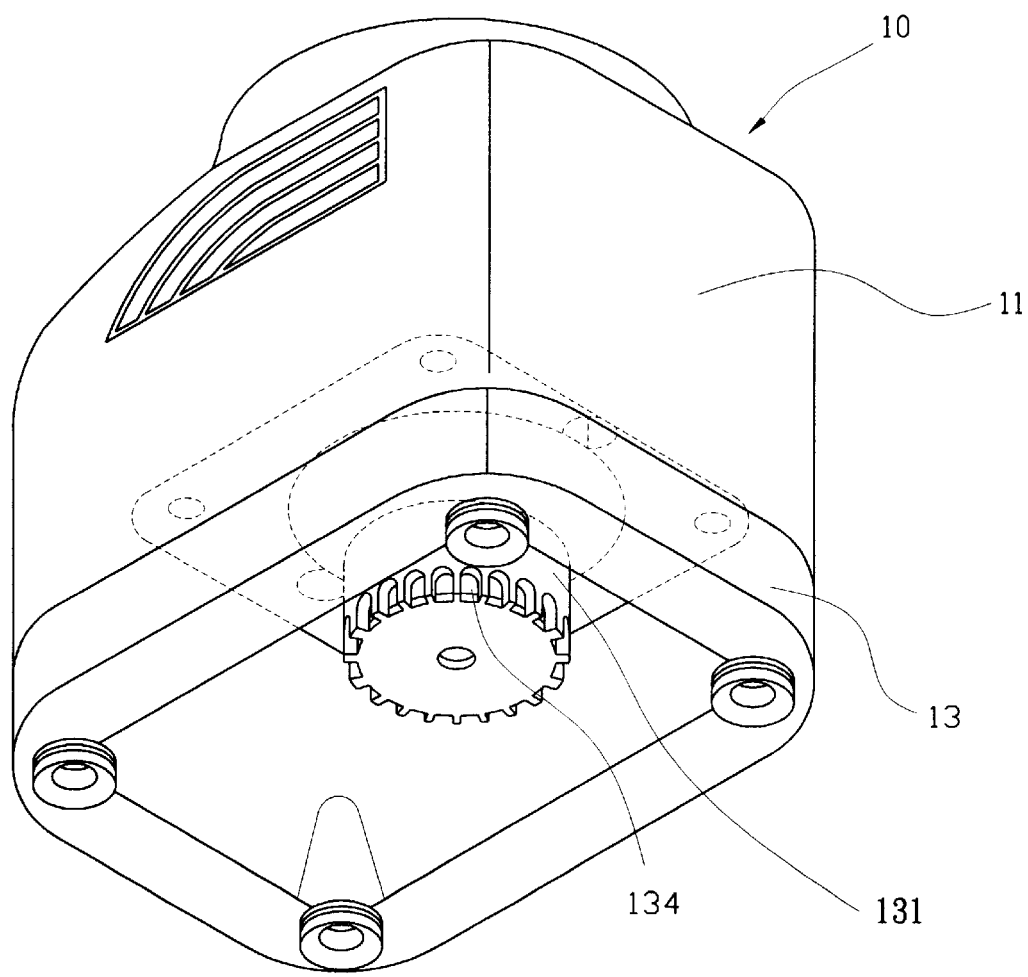
FIG. 4 is a perspective view seen from a bottom of the motor base of the blender of the present invention.
Figure 5:
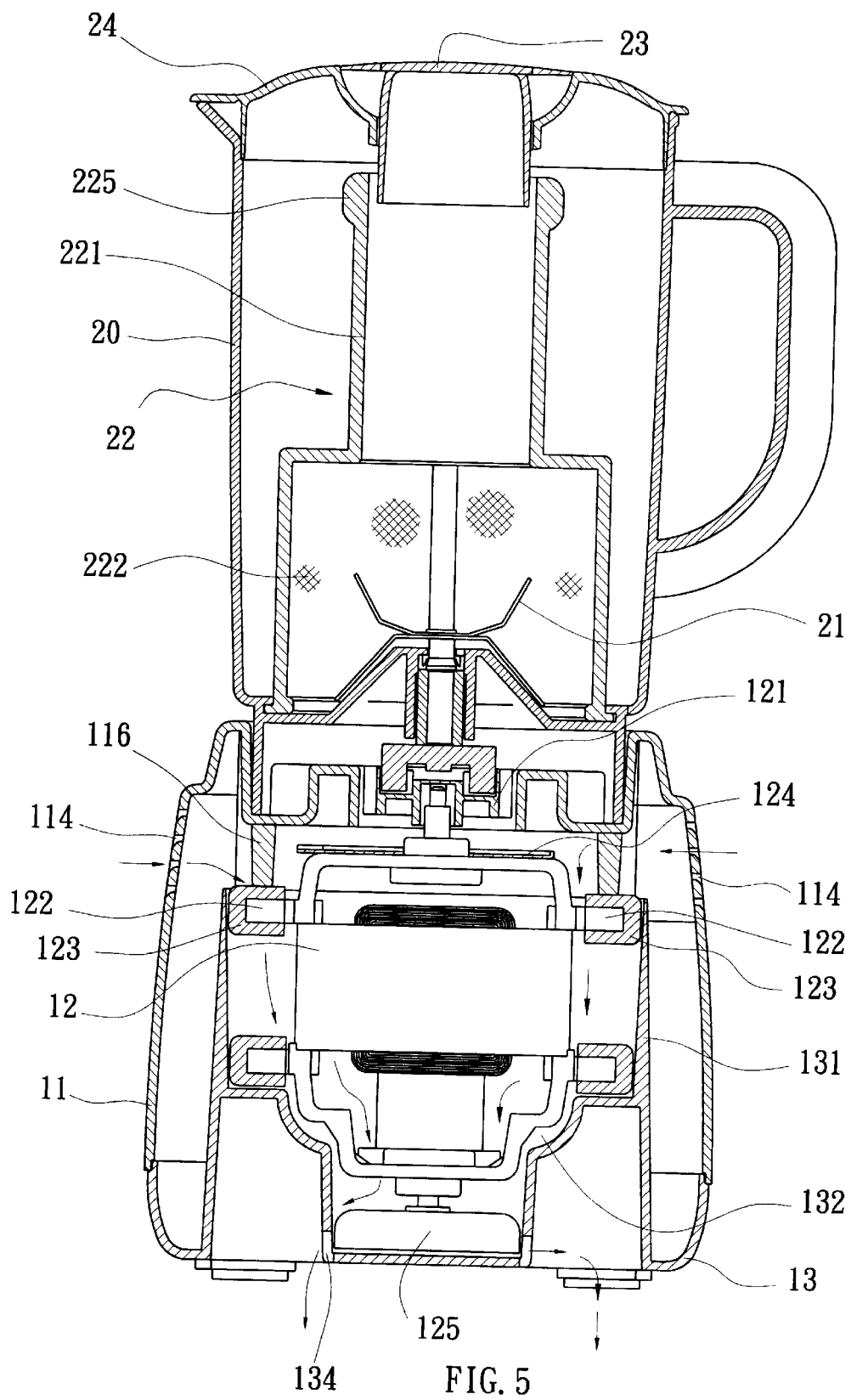
FIG. 5 is a cross sectional view to show the blender of the present invention.

Referring to FIGS. 1 to 4, the blender of the present invention comprises a motor base 10 having a base 13 and a motor retainer 131 is connected to a top surface of the base 13 so that a motor 12 is received in the motor retainer 131. The motor retainer 131 includes two opposite oval walls 132 extending from the top surface of the base 13 and two U-shaped walls 133 are connected to two ends of the two oval walls 132. The motor 12 is received between the two oval walls 132 and two extension frames 122 extend from two sides of the motor 12. Each extension frame 122 is mounted by a block 123 which is received in the U-shaped wall 133. A fin 125 is connected to an underside of the motor 12. An engaging collar 121 is connected to an output shaft of the motor 12 and a plurality of separating ribs 121 1 in the collar 121 to define several partitions 1212 for receiving a shaft 25 as shown in FIG. 5 of a container 20. A plurality of spiral ribs 1213 extend from an outer periphery of We engaging collar 121. A disk 124 is located between the engaging collar 121 and the motor 12 so as to prevent juice or water drops from entering the motor 12.

A casing 11 is mounted to the base 13 and an engaging recess 111 is defined in a top thereof and a locking slot 112 is defined in the engaging recess 111 so as to receive a bottom of the container 20. A central hole 113 is defined in a center of the engaging recess 111 and the engaging collar 121 is received in the central hole 113. A plurality of ventilation slots 114 are defined through the casing 11 and a plurality of ventilation holes 134 are defined through a bottom of the base 13 as shown in FIG. 4. Two pressing members 116 (FIG. 7) extend from an inner side of the top of the casing 11 and press on the blocks 123. The container 20 has a blade device 21 located on an inner bottom of the container 20 and a cover 24 is mounted to a top of the container 20. The cover 24 has a hole for receiving a feeder cap 23.

A filter member 22 is engaged with the inner bottom of the container 20 and the blade device 21 is located in the filter member 22. The inner bottom of the container 20 has three notches 201 and the filter member 22 has three bosses 224 which are engaged with the notches 201. The filter member 22 includes a porous section 222 and a non-porous section 221, the blade device 21 enclosed by the porous section 222 so that the juice will flow from the porous section 222 and retained in the space between the filter member 22 and the container 20, while larger particles are retained in the porous section 222. Two lugs 225 extend from the non-porous section 221 for facilitating assembly of the filter member 22.

Figure 6:
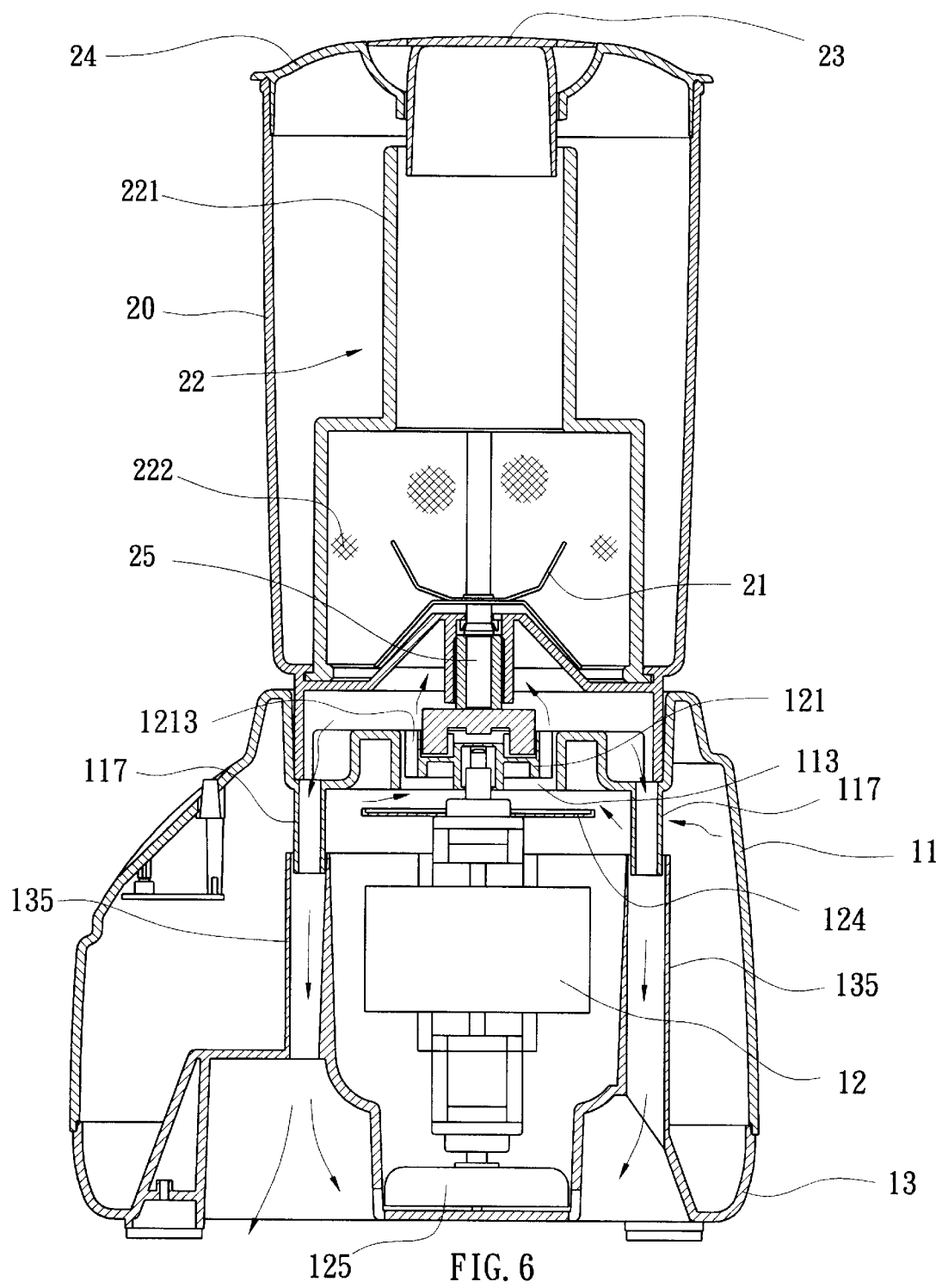
FIG. 6 is a cross sectional view to show another embodiment of the blender of the present invention.
Figure 7:
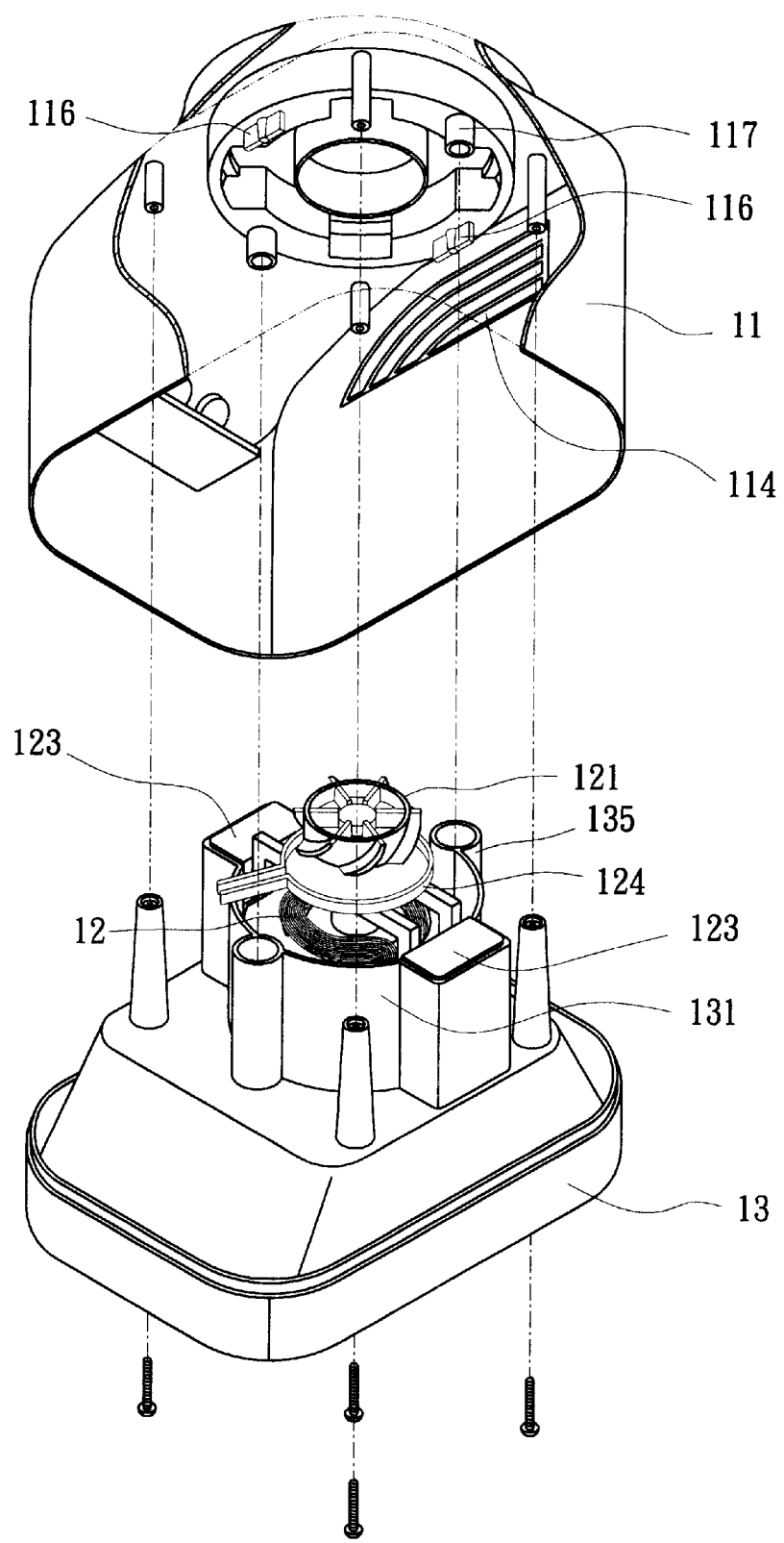
FIG. 7 is an exploded view to show pressing members on the casing, and the base with the motor of the blender of the present invention.

As shown in FIGS. 5 to 7, two first tubes 135 extend from the top surface of the base 13 and the first tubes 135 communicate with the bottom of the base 13. Two second tubes 117 extend from the inner side of the top of the casing 11 and the two second tubes 117 communicate with the first tubes 135. When the motor 12 is operated and the fan 125 rotates, air enters from the ventilation slots 114 of the casing 11 and flows out from the ventilation holes 134 so as to effectively remove the heat generated by the motor 12. The air also enters in the second tubes 117 and flows out from the first tubes 135. The spiral ribs 1213 generate an upward air flow to cool the shaft 25 during the operation of the motor 12.

Figure 8:
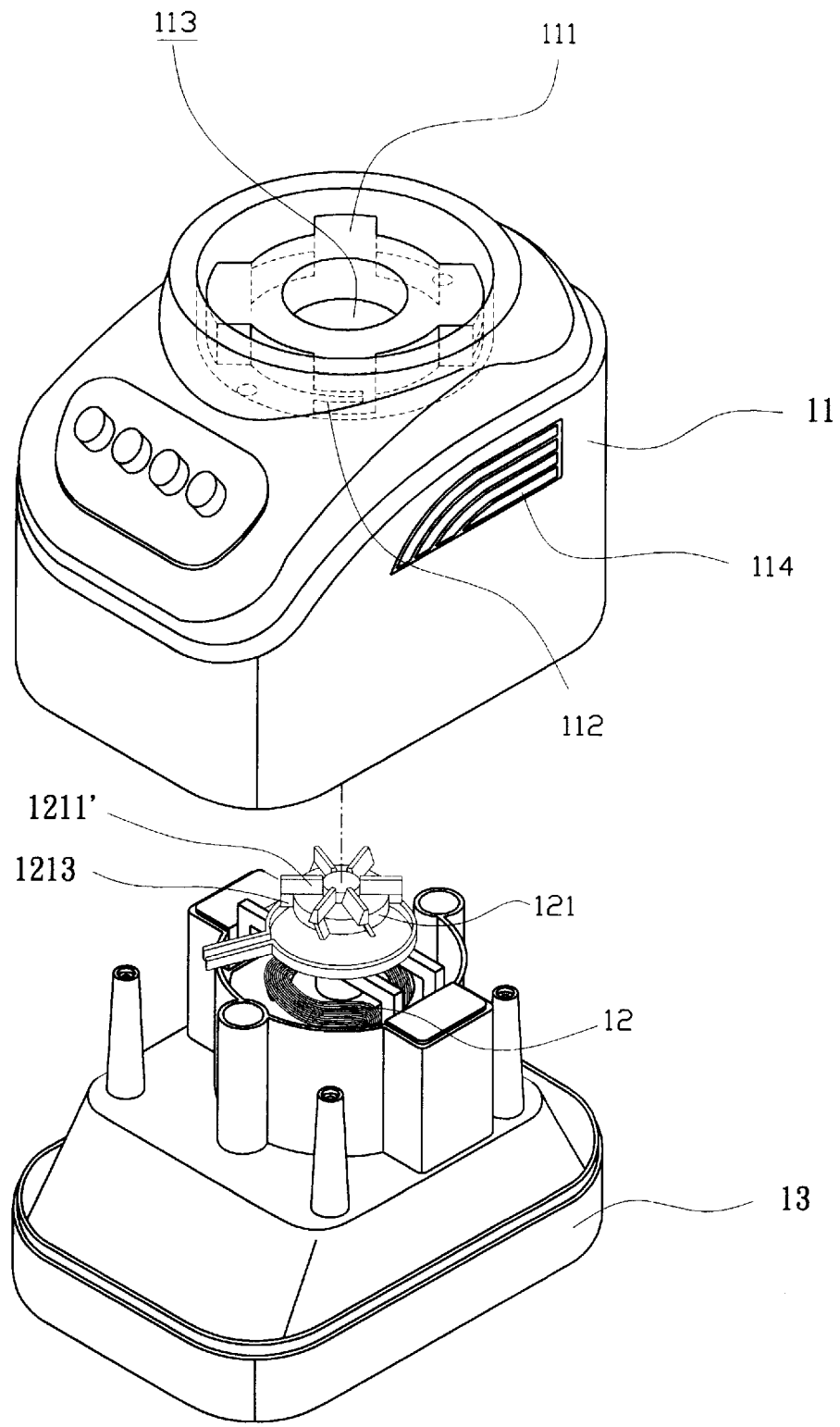
FIG. 8 is an exploded view to show another embodiment of the ribs on the engaging collar of the blender of the present invention.

FIG. 8 shows that the engaging collar is replaced by a plurality of radial plates 1211' and the spiral ribs 1213 are connected to the radial plates 1211'.

Figure 9:
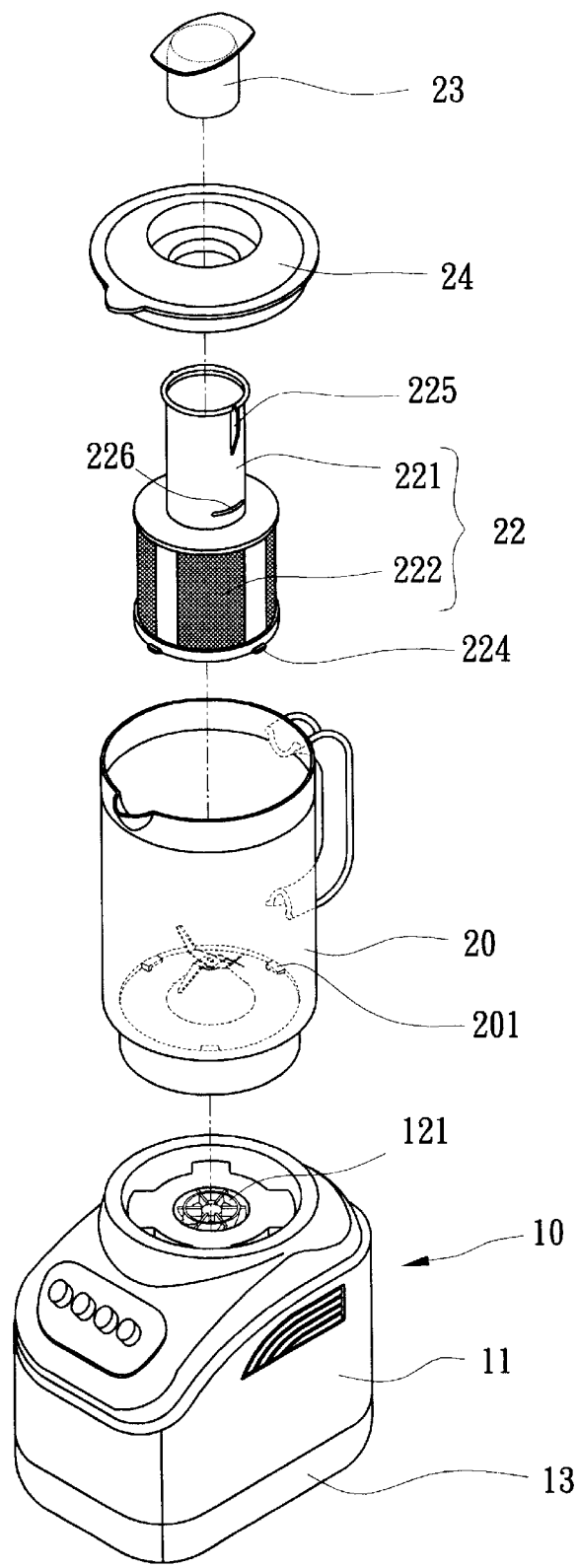
FIG. 9 is an exploded view to show a filter member and the blender of the present invention.

FIG. 9 shows that at least one slot 226 is defined in the non-porous section 221 so as to let juice or water in the space between the filter member 22 and the container 20 enter the porous section 222 to be blended again.

Figure 10:
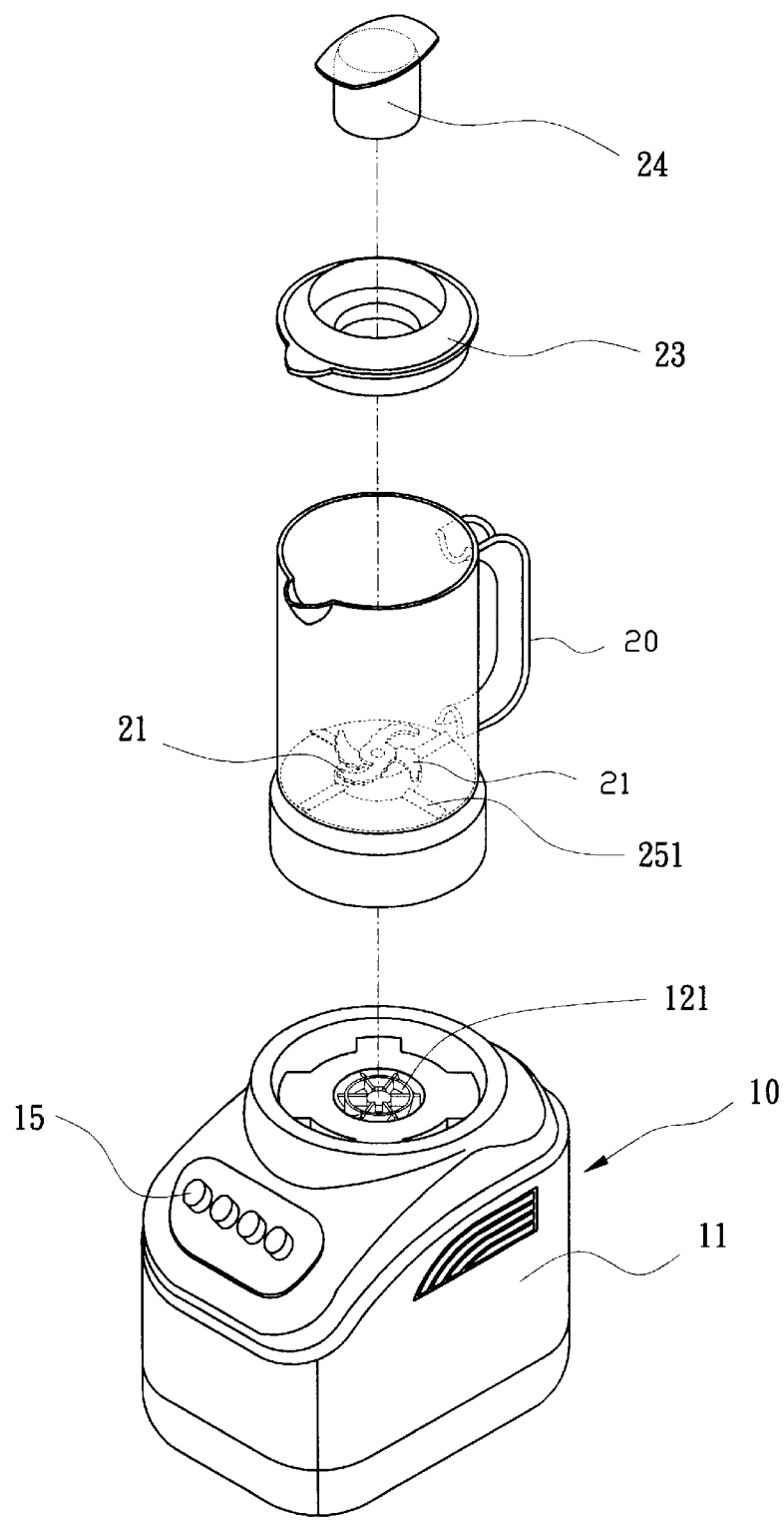
FIG. 10 is an exploded view to show ribs extending from an inner bottom of the container of the blender of the present invention.

FIG. 10 shows that a plurality of ribs 251 extend from the inner bottom of the container 20 and each rib 251 has an inclined surface so that particles of fruit and/or vegetable is kicked upward by the ribs 251 to be cut.

While we have shown and described various embodiments in accordance with the present invention, it should be clear to those skilled in the art that further embodiments may be made without departing from the scope and spirit of the present invention.

What is claimed is:

1. A blender comprising:

a motor base having a base and a plurality of ventilation holes defined through a bottom of said base;

a motor connected to said base;

a casing mounted to said base and a central hole defined in a top of said casing, said engaging collar received in said central hole;

a container mounted to said motor base and a blade device located on an inner bottom of said container; and a motor retainer extending from a top sauce of said base;

wherein said motor retainer includes two opposite oval walls extending from said top surface of said base and two U-shaped walls are connected to two ends of said two oval walls, said motor being received between said two oval walls and two extension frames extending from two sides of said motor, each extension frame mounted by a block which is received in said U-shaped wall.

2. The blender as claimed in claim 1, wherein two pressing members extend from an inner side of said top of said casing and press on said blocks.

3. The blender as claimed in claim 1, further comprising a fan connected to an underside of said motor.

4. The blender as claimed in claim 1, further comprising ventilation slots defined through said casing.

5. The blender as claimed in claim 1, further comprising a plurality of ribs extending from said inner bottom of said container.

6. The blender as claimed in claim 1, further comprising a plurality of spiral ribs extending from an outer periphery of said engaging collar.

7. The blender as claimed in claim 1, further comprising two first tubes extending from a top surface of said base and said first tubes communicating with said bottom of said base, and two second tubes extending from an inner side of said top of said casing, said two second tubes communicating with said first tubes.

8. The blender as claimed in claim 7, further comprising a filter member engaged with said inner bottom of said container, said blade device being located in said filter member.

9. The blender as claimed in claim 8, wherein said inner bottom of said container has three notches and said filter member has tree bosses which are engaged with said notches.

10. The blender as claimed in claim 9, wherein said filter member includes a porous section and a non-porous section, said blade device being enclosed by said porous section and two lugs extending from said non-porous section.

11. The blender as claimed in claim 10, further comprising at least one slot defined in said non-porous section.

12. A blender comprising:

a motor base having a base and a plurality of ventilation holes defined through a bottom of said base;

a motor connected to said base;

an engaging collar connected to said motor;

a casing mounted to said base and a central hole defined in a top of said casing, said engaging collar received in said central hole;

a container mounted to said motor base and a blade device located on an inner bottom of said container; and a plurality of spiral ribs extending from an outer periphery of said engaging collar.

13. The blender as claimed in claim 12, wherein two pressing members extend from an inner side of said top of said casing and press on said blocks.

14. The blender as claimed in claim 12, further comprising a fan connected to an underside of said motor.

15. The blender as claimed in claim 12, further comprising ventilation slots defined through said casing.

16. The blender as claimed in claim 12, further comprising a plurality of ribs extending from said inner bottom of said container.

17. The blender as claimed in claim 12, further comprising two first tubes extending from a top surge of said base and said first tubes communicating wit said bottom of said base, and two second tubes extending from an inner side of said top of said casing, said two second tubes communicating wit said first tubes.

18. A blender comprising:

a motor base having a base and a plurality of ventilation holes defined through a bottom of said base;

a motor connected to said base;

an engaging collar connected to said motor;

a casing mounted to said base and a central hole defined in a top of said casing, said engaging collar received in said central hole;

a container mounted to said motor base and a blade device located on an inner bottom of said container; and a filter member engaged with said inner bottom of said container, said blade device being located in said filter member;

wherein said inner bottom of said container has three notches and said filter member has three bosses which are engaged with said notches.

19. The blender as claimed in claim 18, wherein said filter member includes a porous section and a non-porous section, said blade device being enclosed by said porous section and two lugs extending from said non-porous section.

20. The blender as claimed in claim 19, further comprising at least one slot defined in said non-porous section.

\* \* \* \* \*